(12) United States Patent
Jones et al.

(10) Patent No.: US 7,805,491 B2
(45) Date of Patent: Sep. 28, 2010

(54) E-MAIL MANAGEMENT FOR HIDDEN RECIPIENTS

(75) Inventors: Angela Richards Jones, Durham, NC (US); Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 11/945,837

(22) Filed: Nov. 27, 2007

(65) Prior Publication Data

US 2009/0138559 A1 May 28, 2009

(51) Int. Cl.
*G06F 15/16* (2006.01)
*G06F 3/00* (2006.01)
(52) U.S. Cl. .................................. 709/206; 715/752
(58) Field of Classification Search ................. 709/206; 715/752
See application file for complete search history.

(56) References Cited

U.S. PATENT DOCUMENTS

| | | | | |
|---|---|---|---|---|
| 6,704,772 | B1 * | 3/2004 | Ahmed et al. | 709/207 |
| 7,120,670 | B2 * | 10/2006 | Aikawa et al. | 709/206 |
| 2006/0026244 | A1 * | 2/2006 | Watson | 709/206 |
| 2006/0277263 | A1 * | 12/2006 | Daniels et al. | 709/206 |
| 2008/0168360 | A1 * | 7/2008 | Wilson | 715/752 |

\* cited by examiner

*Primary Examiner*—Philip J Chea
(74) *Attorney, Agent, or Firm*—Daniel McLoughlin, Esq.; Steven M. Greenberg, Esq.; Carey, Rodriguez, Greenberg & Paul, LLP

(57) ABSTRACT

Embodiments of the present invention address deficiencies of the art in respect to e-mail message reply handling and provide a method, system and computer program product for hidden recipient management in e-mail replies. In an embodiment of the invention, a hidden recipients e-mail reply management method can be provided. The method can include composing an e-mail message in a message thread by a composer, identifying and displaying hidden recipients previously blind carbon copied on a progenitor e-mail message for the message thread by the composer, and routing the composed e-mail message to selected ones of the hidden recipients.

5 Claims, 1 Drawing Sheet

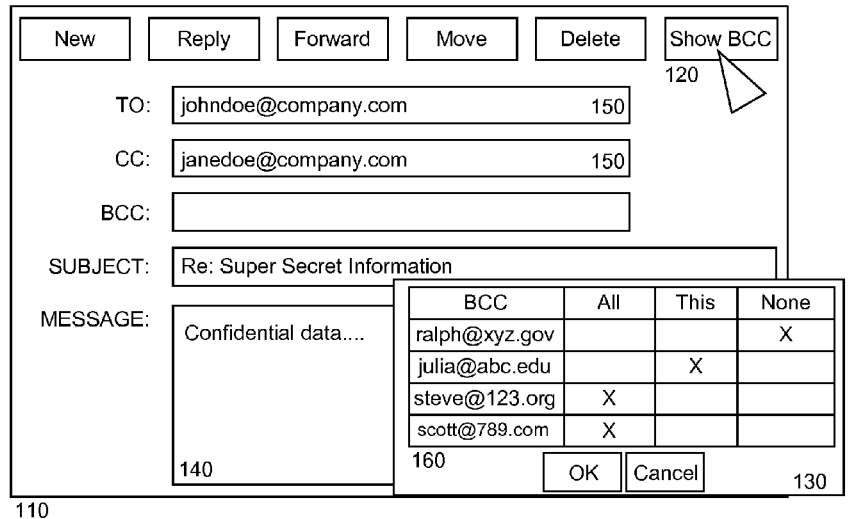
FIG. 1
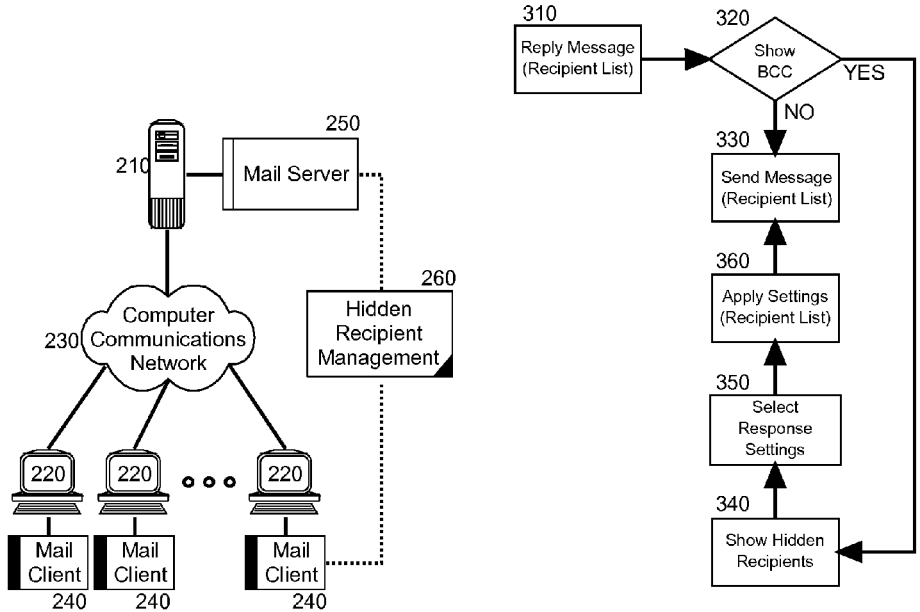
FIG. 2
FIG. 3

E-MAIL MANAGEMENT FOR HIDDEN RECIPIENTS

BACKGROUND OF THE INVENTION

1. Field of the Invention

The present invention relates to the field of e-mail messaging and more particularly to hidden recipient management for e-mail messaging.

2. Description of the Related Art

A variety of electronic messaging systems have arisen which range from real-time instant messaging systems and wireless text pagers to asynchronous electronic mail systems. Electronic mail, a form of electronic messaging referred to in the art as e-mail, has proven to be the most widely used computing application globally. Though e-mail has been a commercial staple for several decades, due to the explosive popularity and global connectivity of the Internet, e-mail has become the preferred mode of communications, regardless of the geographic separation of communicating parties.

E-mail applications allow users to compose and send e-mail to different users, in addition to forwarding e-mails that have been received to other designated recipients. It is common for e-mails to be redistributed several times to many different recipients. As such, there may be times when a user intends to conceal the e-mail address of the sender but not the content of a message when forwarding an e-mail. Likewise, a recipient of a mass-distributed e-mail may not find comfort in others viewing the e-mail address of the recipient in the addressable fields of the mass-distributed e-mail—especially when the others are not known personally to the recipient.

Conventional methods of concealing the identity of an e-mail addressee include protecting the identity of the sender by manually removing the original name of the sender and e-mail address of the sender from the body of the e-mail before redistributing the e-mail. Also, to protect the identity of the recipient, every e-mail address for a corresponding recipient can be manually placed in the blind carbon copy (BCC) address field instead of the "TO" field. When using the BCC address field, the identity of the recipients in the BCC address field will be hidden from view from other addressees.

Message replies can be handled in different ways where an address has been blind carbon copied. In some e-mail systems, a reply to an e-mail message with a blind carbon copied addressee will not be directed to the blind carbon copied addressee. In other e-mail systems, exactly the opposite is true. In the former circumstance, it can be convenient not to exclude a blind carbon copied addressee from a complete thread of discussion associated with the e-mail message. However, in the latter circumstance, the confidentiality associated with a message can be compromised because the responding party will not necessarily have knowledge of all recipients receiving the reply to the e-mail message.

BRIEF SUMMARY OF THE INVENTION

Embodiments of the present invention address deficiencies of the art in respect to e-mail message reply handling and provide a novel and non-obvious method, system and computer program product for hidden recipient management in e-mail replies. In an embodiment of the invention, a hidden recipients e-mail reply management method can be provided. The method can include composing an e-mail message in a message thread by a composer, identifying and displaying hidden recipients previously blind carbon copied on a progenitor e-mail message for the message thread by the composer, and routing the composed e-mail message to selected ones of the hidden recipients.

In one aspect of the embodiment, displaying hidden recipients previously blind carbon copied on a progenitor e-mail message for the message thread by the composer can include displaying a table of hidden recipients previously blind carbon copied on a progenitor e-mail message for the message thread by the composer along with respective response settings. The response settings can include receive all replies in the message thread, receive only the composed e-mail message and receive no replies at all. As such, routing the composed e-mail message to selected ones of the hidden recipients can include routing the composed e-mail message only to a hidden recipients selected to receive all replies in the message thread, or to receive only the composed e-mail message.

In another embodiment of the invention, an e-mail management data processing system can be provided. The system can include an e-mail server coupled to e-mail clients over a computer communications network. The system further can include hidden recipient management logic. The logic can include program code enabled to identify and display hidden recipients previously blind carbon copied on a progenitor e-mail message for a message thread by a composer of an e-mail message and to route the composed e-mail message to selected ones of the hidden recipients. Optionally, the system can include a table of hidden recipients previously blind carbon copied on the progenitor e-mail message for the message thread by the composer along with respective response settings selected from the group consisting of receive all replies in the message thread, receive only the composed e-mail message and receive no replies at all.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of an e-mail client user interface configured for hidden recipient management in e-mail replies;

FIG. 2 is a schematic illustration of an e-mail management system configured for hidden recipient management in e-mail replies; and, FIG. 3 is a flow chart illustrating a process for hidden recipient management in e-mail replies.

DETAILED DESCRIPTION OF THE INVENTION

Embodiments of the present invention provide a method, system and computer program product for hidden recipient management in e-mail replies. In accordance with an embodiment of the present invention, hidden recipients for an e-mail message in a message thread can be tracked throughout the lifecycle of the message thread. Consequently, the sender of the e-mail message at any point in the message thread can establish reply rules for each blind carbon copied hidden recipient of the e-mail message indicating whether or not the blind carbon copied addressee is to receive subsequent replies to the e-mail message in the message thread. In this way, the blind carbon copied hidden recipients need not be universally excluded from the progress of the message thread at the discretion of the sender of the e-mail message.

In illustration, FIG. 1 pictorially depicts an e-mail client user interface configured for hidden recipient management in e-mail replies. As shown in FIG. 1, an e-mail client 110 can provide a user interface through which an end user can compose new e-mail messages, read received e-mail messages, reply to received e-mail messages and forward received e-mail messages. The e-mail client 110 can provide addressing fields 150 in addition to a message entry field 140 into which a message can be specified. The e-mail client 110 further can provide a number of graphical controls configured to initiate a new e-mail message, reply to a received e-mail message, forward a received message, move a received message to storage and delete a received e-mail message as shown in FIG. 1.

Notably, the e-mail client 110 also can provide a reveal hidden recipients user interface control 120. The reveal hidden recipients user interface control 120 can be configured to direct the display of a hidden recipients dialog box 130 when a message is displayed in the e-mail client 110 that is part of a message thread originated by the same user viewing the message in the e-mail client 110. The hidden recipients dialog box 130 can provide a listing of hidden recipients originally specified by the sender when originating the message thread.

Within the hidden recipients dialog box 130, the sender can specify whether or not each of the hidden recipients is to receive copies of all replies in the message thread, a reply only to the e-mail message shown in the e-mail client 110, or none at all. Once specified, each of the hidden recipients will only receive replies in the message thread as specified in the hidden recipients dialog box 130. In this way, the sender and originator of the message thread can selectively determine which of previously blind carbon copied hidden recipients in the message thread are to be included in replies in the message thread and which are to be excluded.

The user interface shown in FIG. 1 can be provided as part of an e-mail management system. In illustration, FIG. 2 is a schematic illustration of an e-mail management system configured for hidden recipient management in e-mail replies. The system can include a host server 210 supporting the operation of an e-mail server 250. The host server 210 can be communicatively coupled to different client computing devices 220 over computer communications network 230, each of the different client computing devices 220 hosting the operation of a respective e-mail client 240, whether the e-mail client 240 is a heavy client or a lightweight client distributed over the computer communications network by the e-mail server 250.

Hidden recipient management logic 260 further can be provided. In this regard, the hidden recipient management logic 260 can be included as part of the e-mail server 250, or the hidden recipient management logic 260 can be included as part of each of the e-mail clients 240. The hidden recipient receipt management logic 260 can include program code enabled to track blind carbon copied hidden recipients of an e-mail message in a message thread. The program code of the hidden recipient management logic 260 further can be enabled to permit an originator of the e-mail message to subsequently view the blind carbon copied hidden recipients in a different e-mail message in the message thread and to set forth reply rules for each of the hidden recipients.

In particular, the reply rules can specify whether or not a hidden recipient is to receive a copy of all replies to all e-mail messages in the message thread, only a copy of the different e-mail message, or no replies or copies at all. Thereafter, the e-mail client 240 and the mail server 250 can enforce the reply rules accordingly. In yet further illustration of the operation of the hidden recipient management logic 260, FIG. 3 is a flow chart illustrating a process for hidden recipient management in e-mail replies.

Beginning in block 310 a reply message to an e-mail message in a message thread can be composed for delivery to specified recipients. In block 320, it can be determined whether or not the composer chooses to view previously blind carbon copied recipients of a progenitor e-mail message for the message thread also composed by the composer. If not, the reply message simply can be routed as usual to the specified recipients in block 330. Otherwise, in block 340 the previously blind carbon copied recipients of the progenitor e-mail message for the message thread can be displayed to the composer.

In block 350, the composer can select one or more response settings for the previously blind carbon copied recipients of the progenitor e-mail message. The settings can include by way of example, receive replies to all messages in the thread, receive a reply on to the current message, or receive no replies at all. Thereafter, in block 360 the response settings can be applied to the previously blind carbon copied recipients of the progenitor e-mail message and the distribution list for the reply message can be expanded accordingly. Finally, in block 330 the reply message can be routed to the recipients in the distribution list.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A hidden recipients e-mail reply management method comprising:
   composing an e-mail message in a message thread by a composer;
   identifying and displaying a table of hidden recipients along with respective response settings selected from the group consisting of receive all replies in the message thread, receive only the composed e-mail message and receive no replies at all, previously blind carbon copied on a progenitor e-mail message for the message thread by the composer; and,
   routing the composed e-mail message to selected ones of the hidden recipients.

2. The method of claim 1, wherein routing the composed e-mail message to selected ones of the hidden recipients, comprises routing the composed e-mail message only to a hidden recipients selected to receive all replies in the message thread, or to receive only the composed e-mail message.

3. An e-mail management data processing system comprising:
   an e-mail server coupled to a plurality of e-mail clients over a computer communications network; and,
   hidden recipient management logic comprising program code enabled to identify and display a table of hidden recipients along with respective response settings selected from the group consisting of receive all replies in the message thread, receive only the composed e-mail message and receive no replies at all, previously blind carbon copied on a progenitor e-mail message for a message thread by a composer of an e-mail message
   and to route the composed e-mail message to selected ones of the hidden recipients.

4. A computer program product comprising a computer usable medium embodying computer usable program code for hidden recipients e-mail reply management, the computer program product comprising:
   computer usable program code for composing an e-mail message in a message thread by a composer;
   computer usable program code for identifying and displaying a table of hidden recipients along with respective response settings selected from the group consisting of receive all replies in the message thread, receive only the composed e-mail message and receive no replies at all, previously blind carbon copied on a progenitor e-mail message for the message thread by the composer; and,
   computer usable program code for routing the composed e-mail message to selected ones of the hidden recipients.

5. The computer program product of claim 4, wherein the computer usable program code for routing the composed e-mail message to selected ones of the hidden recipients, comprises computer usable program code for routing the composed e-mail message only to a hidden recipients selected to receive all replies in the message thread, or to receive only the composed e-mail message.

\* \* \* \* \*